Jan. 14, 1936.  R. K. HOPKINS  2,027,979
BOOT PUMP
Filed July 14, 1934
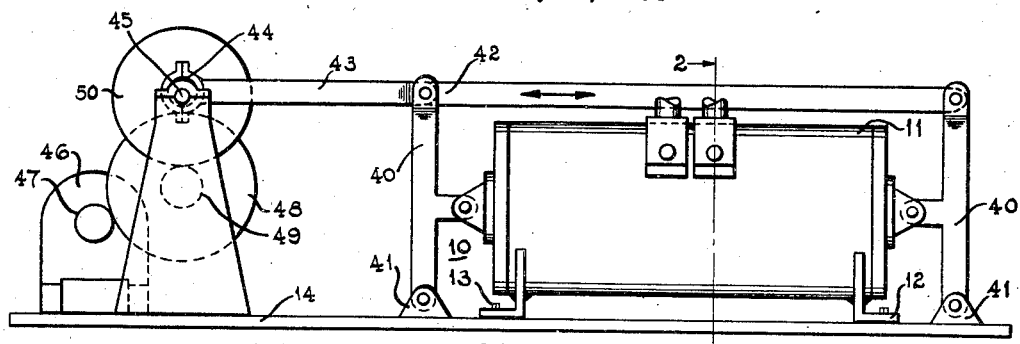
Fig-1
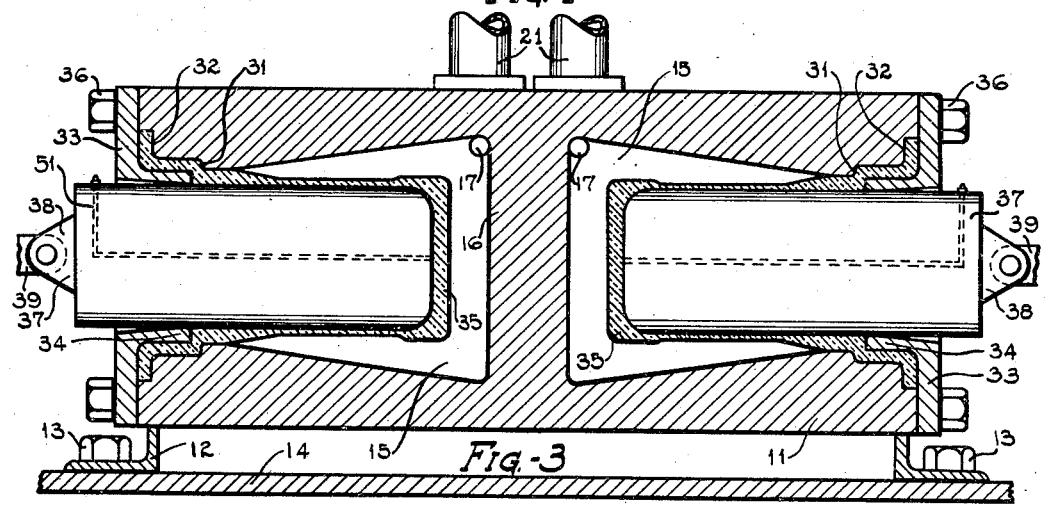
Fig-3
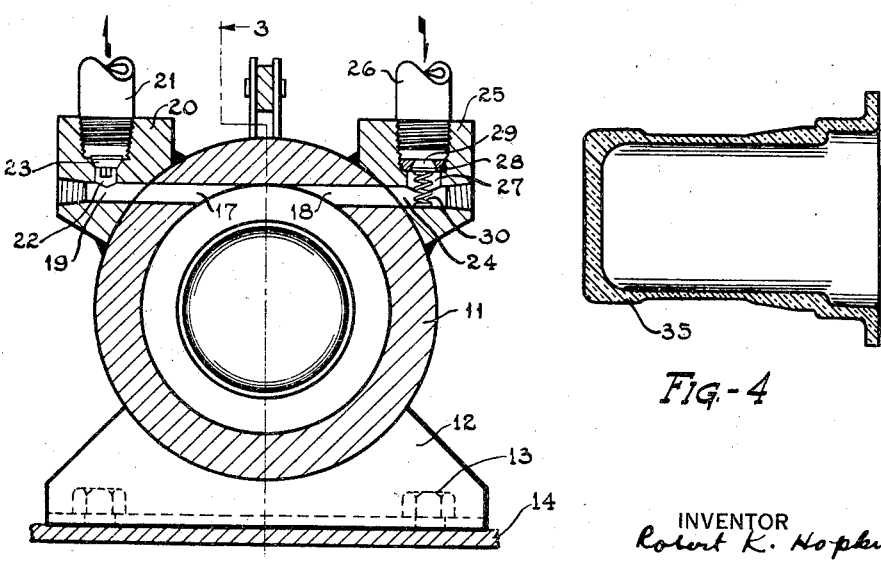
Fig-2
Fig-4
INVENTOR
Robert K. Hopkins
BY
Virgil F. Davis
ATTORNEY Patented Jan. 14, 1936

2,027,979

UNITED STATES PATENT OFFICE 2,027,979

BOOT PUMP

Robert K. Hopkins, New York, N. Y., assignor to M. W. Kellogg Company, New York, N. Y., a corporation of Delaware Application July 14, 1934, Serial No. 735,187

5 Claims. (Cl. 103—148)

This invention relates in general to fluid pumps and in particular to pumps of the character in which plungers are used as pumping elements.

Most of the trouble experienced in the use of plunger pumps is due to the inability to maintain the connection between the plunger and the plunger chambers fluid tight. Glands, special packing arrangements, etc., have been devised in attempts to prevent objectionable leakage but nothing heretofore proposed has proven satisfactory, especially when the pumps are used to develop high pressure, or are used as gas compressors, or are used to pump highly penetrative fluids such as hydrocarbon oils.

It is an object of this invention to provide a plunger pump which can be used to pump any fluid and develop any ordinary pressure without leakage whatsoever.

It is also a further object of this invention to provide a plunger pump in which the connection between the plungers and the plunger chambers are maintained fluid tight without the use of glands, packing and the like.

It is also an object of this invention to provide a plunger pump in which an impervious elastic boot is positioned in the plunger chamber to surround the plunger and expand and contract with the movement thereof whereby the fluid pumped cannot leak out between the walls of the plunger cylinder and the plunger.

The further objects and advantages of the invention will be apparent from the description of a preferred embodiment thereof taken with the accompanying drawing in which, Fig. 1 is a front elevation of a pump embodying my invention, Fig. 2 is a sectional view taken on line 2—2 of Fig. 1, Fig. 3 is a sectional view taken on line 3—3 of Fig. 2, and Fig. 4 is a sectional view of an unexpanded plunger boot.

Pump 10 includes a cylindrical body 11 to which are connected, as by welding, supports 12. Bolts 13 pass through supports 12 and secure body 11 to base 14. Body 11 has two plunger chambers 15 therein which open at opposite ends of cylinder 11 and are separated by partition 16. The walls of body 11 adjacent the closed ends of plunger chambers 15 are bored to provide passageways 17 and 18, one pair of such passageways being provided for each of plunger chambers 15.

Passageway 17 opens into an aligned passageway 19 formed in outlet valve housing 20, the outside end of passageway 19 being closed by a threaded plug. Housing 20 is welded to the walls of body 11 so as to be an integral part thereof. Passageway 19 is put into communication with outlet pipe 21, which is threaded into housing 20, by short passageway 22. The upper end of passageway 22 has a valve seat formed therein upon which seats outlet valve 23.

Passageway 18 opens into an aligned passageway 24 formed in inlet valve housing 25, the outside end of passageway 24 being closed by a threaded plug. Housing 25 is also welded to the walls of body 11. Passageway 24 communicates with inlet pipe 26, which is threaded into housing 25, through short passageway 27. A plate, 28, having a valve seat therein is screwed against the end of passageway 27. An inlet valve 29 is constantly urged toward the seat in plate 28 by spring 30. Inlet pipes 21 are connected together, in a manner not shown, and lead the fluid to be pumped from a supply, not shown. Outlet pipes 26 are also connected together, in a manner not shown, and lead pumped fluid to a point of use, also not shown.

Plunger chambers 15 are generally frustoconical in shape and the portion of body 11 that encircles their small ends is stepped to provide a pair of shoulders 31 and 32. Flanges 33, that include inwardly directed bearings 34, close the stepped portions of body 11 to provide annular spaces in which fit the ends of boots 35. Flanges 33 are held in position by bolts 36 which also provide a means for holding the ends of boots 35 securely in the annular spaces between bearings 34 and shoulders 31 and 32. Boots 35 are generally cylindrical in shape and are thicker at their ends than at their middle, as best shown in Fig. 4, so that they will expand in the middle rather than at the ends and thus prevent wear at the ends. Boots 35 are made of impervious elastic material of a nature which will not dissolve or be deleteriously affected by the fluid pumped. When pump 10 is to be used as a compressor for the ordinary gases, such as air, and the like, or is to be used to pump water, water solutions, etc., rubber is a suitable material for boots 35. When pump 10 is used as a compressor for hydrocarbon gases, or is to be used to pump hydrocarbon oils, boots 35 are formed out of material that is impervious to, and unaffected by, the hydrocarbon gas or oil. Many of the now available synthetic compounds are suitable material for this purpose. Boots 35 may also be made of metal and corrugated between their ends to provide for the necessary elasticity.

Boots 35 are made of a size to closely encircle plungers 37. Plungers 37 are of a size to bear on bearings 34 and are provided with ears 38 that are pivoted on arms 39 of levers 40. The lower end of each of levers 40 is pivoted to ears 41 that are fastened, as by welding, to base 14. In the upper ends of levers 40 are pivoted the ends of lever 42. In the upper end of the left hand one of levers 40 is also pivoted one end of connecting rod 43 that is connected to a collar that encircles eccentric 44 carried by shaft 45. Shaft 45 is driven by motor 46 through gears 47, 48, 49 and 50. Lubrication ducts 51 are drilled in plungers 37 so that a suitable lubricant, which will not deleteriously affect the material of boots 35, can be passed between plungers 37 and boots 35 to facilitate their relative movement.

When motor 46 is caused to rotate, by closing its circuit, gears 47, 48, 49 and 50 will rotate shaft 45 and eccentric 44 thus moving connecting rod 43 and lever 42 back and forth to oscillate levers 40 and to move plungers 37 in and out of their respective plunger chambers 15. It is to be noted that by means of the arrangement shown, one plunger 37 will move out of its plunger chamber 15 while the other plunger 37 moves into its plunger chamber 15.

When either of plungers 37 is in its extreme out position its boot 35 will be undistended and of normal length, also valves 23 and 29 will be on their respective seats.

When either of plungers 37 moves from its extreme out position to its extreme in position its boot 35 will stretch and move with plunger 37. This movement will displace the fluid in plunger chamber 15 thereby creating pressure which will result in closing inlet valve 29 and opening outlet valve 23. The displaced fluid will flow through pipe 21. Since the outer end of boot 35 is fixed in position in the annular space between flange 33 and the end of cylinder 11 and the thickness of boot 35 in the region adjacent bearing 34 is greater than the thickness of its middle portion, boot 35 will stretch and diminish in thickness only in the middle portion. Thus leakage is effectively prevented. By reason of the arrangement used to hold boot 35 in position the pressure developed during the pumping stroke actually helps to prevent leakage since it tends to force boot 35 into the annular space between the end of cylinder 11 and flange 33. The lubricant which is passed between plunger 37 and boot 35 through duct 51 prevents boot 35 gripping plunger 37 and assures the desired expansion of boot 35.

When either of plungers 37 moves from its extreme in position to its extreme out position its boot 35 will contract with it. The pressure in plunger chamber 15 will diminish to seat outlet valve 23 and to unseat inlet valve 29 thus allowing fluid to enter plunger chamber 15 through pipe 26.

I claim:

1. In combination with a pump body, a pump chamber formed in said body, fluid inlet means communicating with said chamber, fluid outlet means communicating with said chamber, pumping means movable in said chamber, and elastic means fastened to said body and extending into said chamber adapted to surround said pumping means, said elastic means being of minimum thickness intermediate the ends thereof whereby the distortion of said elastic means incident to the movement of said pumping means takes place intermediate the ends of said elastic means.

2. A plunger pump comprising a body having an open chamber therein, fluid inlet means communicating with said chamber, fluid outlet means communicating with said chamber, the wall of said body defining the open end of said chamber being shaped to form a plurality of annular shoulders, an elastic boot extending into said chamber, said boot having an open end and the walls of said boot adjacent said open end being shaped to fit on said shoulders, means including an inwardly directed bearing which is adapted to fit into the open end of said boot for forcing said shaped walls of said boot against said shoulders in fluid tight relation, and a plunger adapted to be reciprocated in said chamber extending into said boot and filling substantially all of the internal space thereof, said boot including an expansion area intermediate its ends whereby the deformation of said boot incident to the movement of said plunger takes place in said expansion area and the portion of said boot between said shoulders and said bearing remains undeformed during the movement of said plunger.

3. A plunger pump comprising a body having an open ended chamber therein, fluid inlet means communicating with said chamber, fluid outlet means communicating with said chamber, the wall of said body defining the open end of said chamber being shaped to form a plurality of annular shoulders, an elastic boot extending into said chamber, said boot having an open end and a closed end, the walls of said boot adjacent said open end being shaped to fit on said shoulders, said boot including a portion intermediate its ends of minimum thickness, means including an inwardly directed bearing which is adapted to fit into the open end of said boot for forcing said shaped walls of said boot against said shoulders in fluid tight relation, and a plunger extending in said boot adapted to be reciprocated in said chamber.

4. A plunger pump comprising a body having an open ended chamber therein, fluid inlet means communicating with said chamber, fluid outlet means communicating with said chamber, the wall of said body defining the open end of said chamber being shaped to form a plurality of annular shoulders, an elastic boot extending into said chamber, said boot having an open end and the walls of said boot adjacent said open end being shaped to fit on said shoulders, means including an inwardly directed bearing which is adapted to fit into the open end of said boot for forcing said shaped walls of said boot against said shoulders in fluid tight relation, a plunger in said boot adapted to be reciprocated in said chamber, and a duct in said plunger having one end opening outside of said boot and the other end opening at the end of the plunger in the boot whereby lubricant may be passed between said boot and said plunger.

5. An elastic boot adapted to separate the plunger chamber and the plunger of a plunger pump which comprises a cylindrical body portion having one end closed and the other end opened, the walls at said open end being shaped to provide outwardly extending flange like portions, the portion of said cylindrical body between said ends being of reduced thickness.

ROBERT K. HOPKINS.